United States Patent
Madsen

(10) Patent No.: US 10,745,078 B2
(45) Date of Patent: Aug. 18, 2020

(54) REAR WHEEL SUSPENSION SYSTEM FOR A TWO-WHEELED VEHICLE

(71) Applicant: Damon Madsen, Jerome, ID (US)

(72) Inventor: Damon Madsen, Jerome, ID (US)

(73) Assignees: Damon Madsen, Jerome, ID (US); Trina Benson, Hailey, ID (US)

(*) Notice: Subject to any disclaimer, the term of this patent is extended or adjusted under 35 U.S.C. 154(b) by 219 days.

(21) Appl. No.: 15/957,643

(22) Filed: Apr. 19, 2018

(65) Prior Publication Data

US 2018/0304958 A1    Oct. 25, 2018

Related U.S. Application Data

(60) Provisional application No. 62/487,116, filed on Apr. 19, 2017.

(51) Int. Cl.
*B62K 25/28* (2006.01)
*B62K 25/30* (2006.01)

(52) U.S. Cl.
CPC ............ *B62K 25/286* (2013.01); *B62K 25/30* (2013.01)

(58) Field of Classification Search
CPC ...... B62K 25/04; B62K 25/28; B62K 25/286; B62K 25/30
USPC ...................................................... 280/283
See application file for complete search history.

(56) References Cited

U.S. PATENT DOCUMENTS

| | | | |
|---|---|---|---|
| 5,452,910 A * | 9/1995 | Harris | B62K 25/26 280/283 |
| 5,553,881 A | 9/1996 | Klassen | |
| 6,206,397 B1 | 3/2001 | Klassen | |
| 7,661,503 B2 | 2/2010 | Weagle | |
| 7,815,207 B2 | 10/2010 | Currie | |
| 8,590,914 B2 | 11/2013 | Domahidy | |
| 9,061,729 B2 | 6/2015 | Canfield | |
| 9,145,185 B1 | 9/2015 | Claro | |
| 9,168,977 B2 | 10/2015 | McLeay | |
| 9,216,791 B2 | 12/2015 | Hudec | |
| 9,242,693 B2 | 1/2016 | Voss | |
| 2004/0070169 A1* | 4/2004 | Lesage | B62K 25/286 280/284 |
| 2004/0239071 A1* | 12/2004 | Chamberlain | B62K 25/286 280/284 |
| 2004/0256834 A1* | 12/2004 | Whyte | B62K 25/286 280/283 |
| 2005/0057018 A1* | 3/2005 | Saiki | B62K 25/286 280/284 |

(Continued)

*Primary Examiner* — Joseph M Rocca
*Assistant Examiner* — Conan D Duda
(74) *Attorney, Agent, or Firm* — Shaver & Swanson, LLP; Scott D. Swanson

(57) ABSTRACT

What is disclosed is an improved rear suspension for a two wheeled vehicle. The improved rear suspension includes a rear triangle connected to a wheel. The rear triangle is connected to the front triangle by an upper linkage. A biasing member, such as a shock absorber, typically a spring and damper, is connected to the front triangle and functionally connected to the rear triangle, either directly or indirectly. The rear triangle is further connected to the front triangle by a pivoting connection. The pivoting connection can be a eccentric pivot. Alternatively the pivoting connection can be a pivot connection located on the front triangle and a pivot connection located on the rear triangle and connected by a lower linkage.

9 Claims, 12 Drawing Sheets

(56) References Cited

U.S. PATENT DOCUMENTS

| | | | |
|---|---|---|---|
| 2005/0067806 A1* | 3/2005 | Weagle | B62K 25/28 280/124.1 |
| 2005/0156402 A1* | 7/2005 | Carroll | B62K 25/28 280/284 |
| 2006/0022428 A1* | 2/2006 | Whyte | B62K 25/286 280/283 |
| 2006/0022429 A1 | 2/2006 | Ellsworth et al. | |
| 2006/0071442 A1* | 4/2006 | Hoogendoorn | B62K 25/286 280/275 |
| 2006/0225942 A1* | 10/2006 | Weagle | B62K 25/24 180/357 |
| 2007/0108725 A1* | 5/2007 | Graney | B62K 25/286 280/284 |
| 2008/0217882 A1* | 9/2008 | Beaulieu | B62K 25/28 280/261 |
| 2009/0072512 A1* | 3/2009 | Earle | B62K 25/286 280/283 |
| 2009/0315296 A1* | 12/2009 | Berthold | B62K 25/286 280/284 |
| 2010/0059965 A1 | 3/2010 | Earle | |
| 2010/0102531 A1* | 4/2010 | Graney | B62K 25/286 280/284 |
| 2011/0140387 A1 | 6/2011 | Andal | |
| 2011/0227312 A1* | 9/2011 | Earle | B62K 25/20 280/283 |
| 2011/0233892 A1 | 9/2011 | Domahidy | |
| 2014/0210180 A1* | 7/2014 | Hudak | B62K 13/08 280/274 |
| 2015/0251724 A1* | 9/2015 | Hudec | B62K 25/30 280/283 |
| 2016/0257371 A1* | 9/2016 | Droux | B62K 25/28 |
| 2016/0257373 A1* | 9/2016 | Emura | B62M 6/50 |
| 2018/0099723 A1* | 4/2018 | Rojo Vidal | B62M 9/00 |
| 2018/0265165 A1* | 9/2018 | Zawistowski | B62K 25/286 |
| 2019/0248443 A1* | 8/2019 | Yi | B62K 25/286 |

* cited by examiner

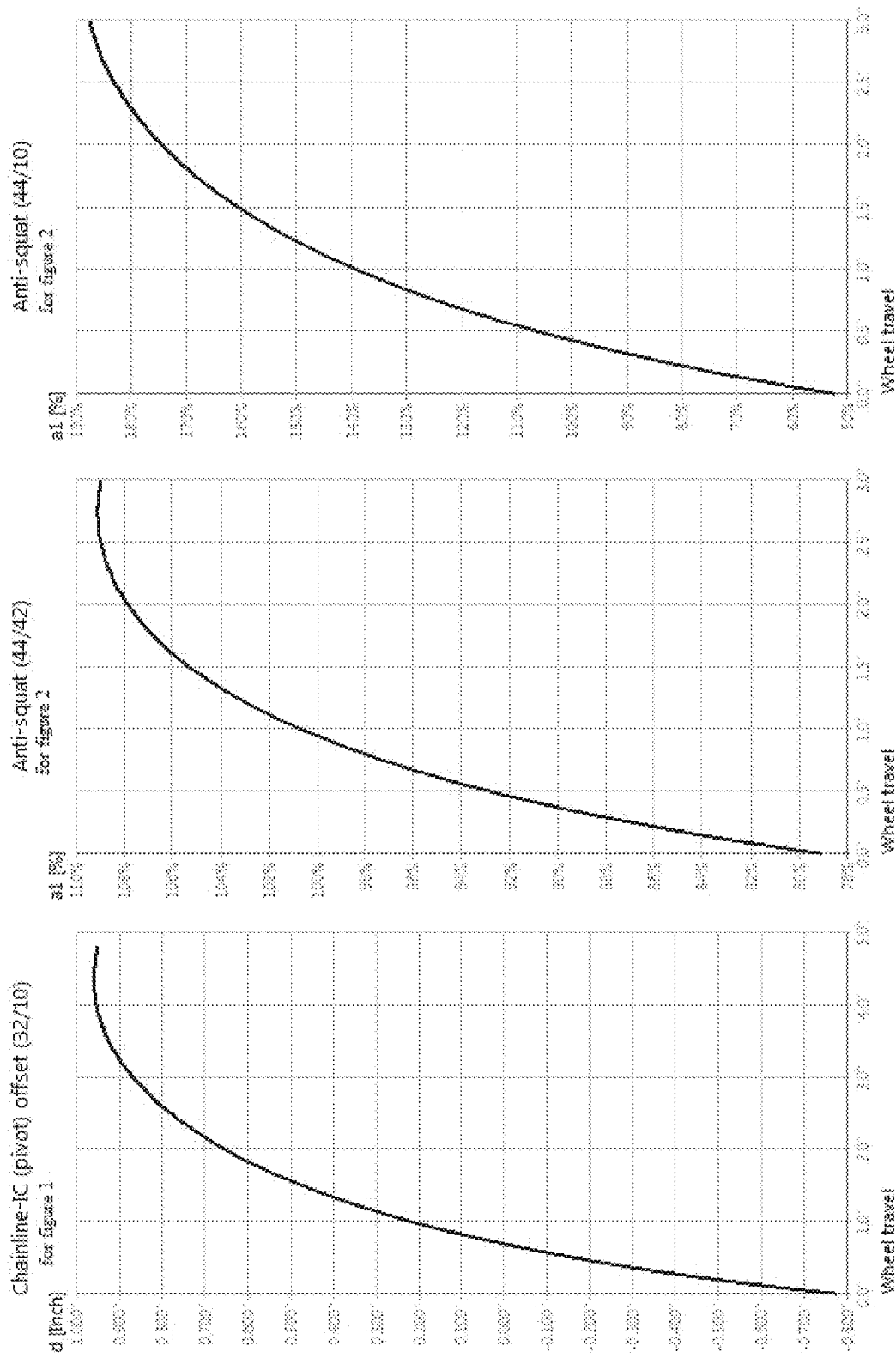

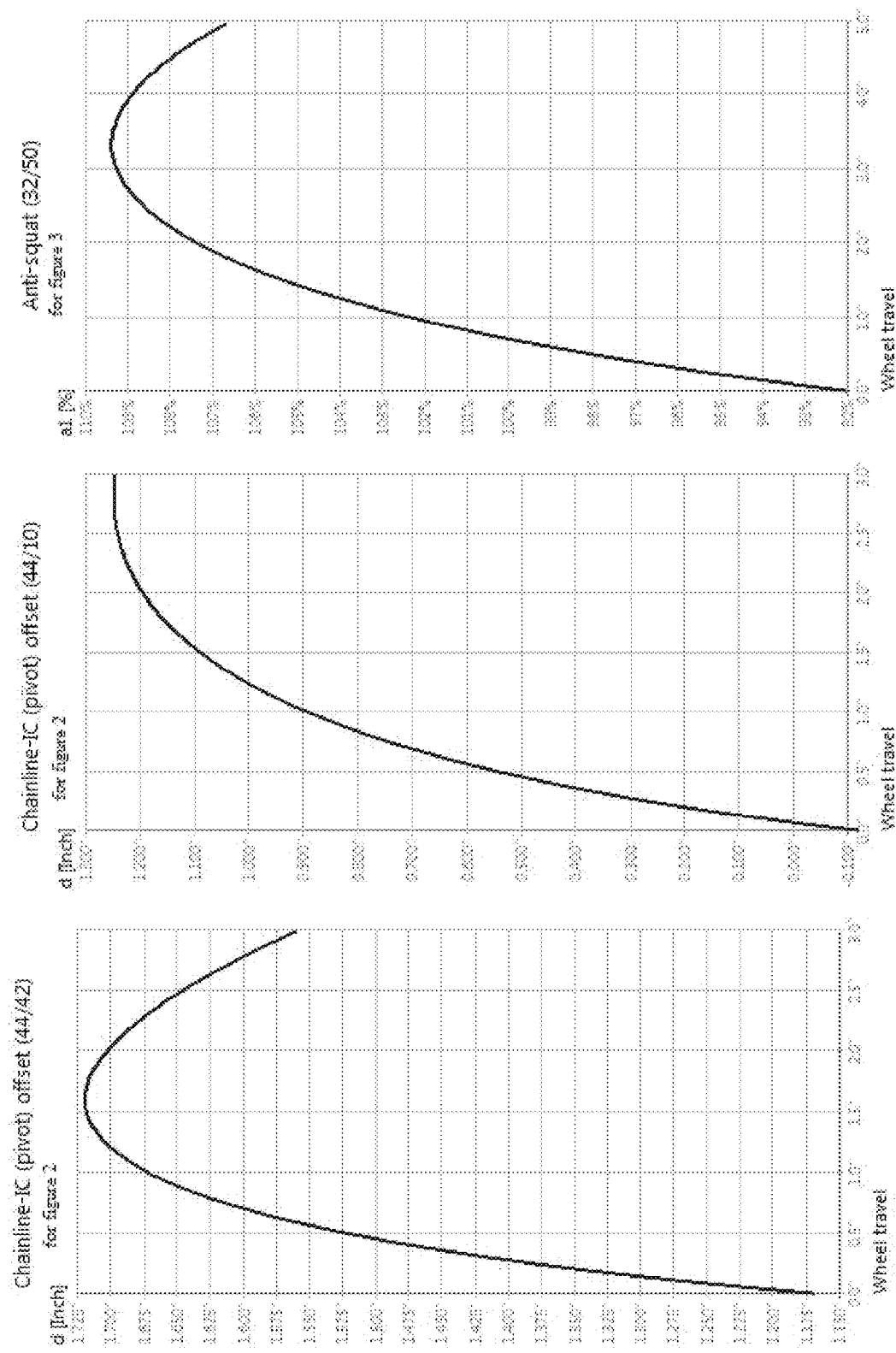

REAR WHEEL SUSPENSION SYSTEM FOR A TWO-WHEELED VEHICLE

PRIORITY/CROSS-REFERENCE TO RELATED APPLICATIONS

This application claims the benefit of U.S. Provisional Application No. 62/487,116 filed Apr. 19, 2017, the disclosure of which is incorporated by reference.

TECHNICAL FIELD

The disclosure generally relates to the field of the invention relates generally to a rear wheel suspension system. The suspension system is particularly useful for a two-wheeled vehicle such as but not limited to a bicycle or mountain bike.

BACKGROUND INFORMATION

Mountain biking is a very popular sport throughout the United States and the world. In order to provide a more comfortable ride, mountain bike riders often will ride dual suspension bicycles. Dual suspension bicycles have a biasing member (often called a shock absorber) at the front of the frame to dampen biasing member generated by the front wheel and a biasing member absorber connected to the main frame and/or rear frame (generally the rear triangle) of the bicycle to dampen biasing member from the rear wheel of the bicycle. The latter is generally called a rear suspension bicycle. A rear suspension bicycle utilizes a linkage system to link the rear triangle of the bicycle to the main frame of a bicycle in combination with a biasing member absorber. The arrangement of this linkage system directly affects the performance of the rear suspension of the bicycle. Thus, the rear suspension can be designed in a variety of layouts for a variety of purposes.

A prime concern when designing a rear suspension system is to assess the performance of the rear suspension for an intended use of a bicycle bearing that suspension. For example, in a bicycle designed for traveling both uphill and downhill, an ideal design will allow the rear suspension to provide sufficient dampening of shock while traveling downhill, yet minimize the negative effects caused by the rear suspension when a mountain bike rider is traveling uphill. These negative effects include, for example, the tendency of a rear suspension bicycle to compress under acceleration, which creates inefficiency in pedaling as force is lost due to the compression of the rear suspension, and in some designs the tendency of the shock absorber to extend and exert force upward on the mountain bike rider. These phenomena are well known and attempts to overcome them are generally called anti-squat. Anti-squat thus seeks to maximize the efficiency of the rear suspension by seeking to maximize the amount of pedaling or acceleration energy translated into forward motion. Thus a bike with a high anti-squat has a lower tendency of the shock absorber to compress while a bicycle with too high of anti-squat has a tendency of the shock absorber to exert force in the opposite direction of compression, also known as extending.

However, maximizing anti-squat can come at a disadvantage in that if a bicycle has too much anti-squat, it can lead to an extension of the rear shock in response to a user pedaling and/or pedal kickback when the suspension compresses when a user is accelerating over bumps in the trail.

To measure the anti-squat principles of a bicycle or other wheeled vehicle, the instant center (or "IC") of the rear suspension is measured. The instant center of a bicycle has a common meaning in the bicycle industry, but in general is defined as an imaginary point about which the rear axle is rotating around at any given instant. The IC moves or migrates as the rear suspension compresses. The assembly of the rear suspension is designed in order to provide an IC migration, and thus anti-squat behavior, in response to a given condition. Thus an ideal bicycle rear suspension for a bicycle utilized for both uphill and downhill riding, such as cross country riding, that is supple and shock absorbent when traveling downhill yet efficient and feels as close to "locked", or in performance terms as similar to a bicycle lacking a rear suspension, as possible when under either pedal power or motor power. In general a line denoting the IC across the range of compression of a bicycle suspension indicates a stiffer suspension across compression if the line moves up and/or back whereas an IC line moving down and typically forward indicates a less stiff suspension.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is an improved rear wheel suspension for a two-wheeled vehicle, such as a bicycle or motorcycle. The rear wheel suspension system has a rear triangle coupled to a rear wheel. The rear triangle is connected to a front triangle by an upper linkage. The rear triangle is connected to the upper linkage by a first upper pivot member. The front triangle is connected to the upper linkage by a second upper pivot member.

The front triangle is further pivotally connected to the rear triangle at a rear triangle pivot point on the rear triangle generally in front of or even with a forward circumference point of said chainring. The term forward is in reference to the two wheeled vehicle in an upright position. This connection can be a eccentric pivot. Alternatively this connection can utilize a lower linkage. The rear triangle being connected to the lower linkage at the rear triangle pivot point. The lower linkage being connected to the front triangle at a front triangle pivot point.

A bottom is bracket mounted to the front triangle. The bottom bracket is structured to house a pedal assembly. The bottom bracket has a chainring mounted on the bottom bracket so as the center of the chainring is at the center of said bottom bracket.

The suspension system includes a biasing member connected to the front triangle and functionally connected to the rear triangle. The biasing member is structured to be compressed in response to a force applied to the rear wheel. The biasing member is commonly referred to as a shock absorber in the industry. The biasing member can be directly connected to the rear triangle. Alternatively the biasing member can be functionally connected to the rear triangle via the upper linkage. In an embodiment the upper linkage is in a triangular shape to provide connection between the biasing member, the rear triangle and the front triangle. The biasing member can be in a generally vertical orientation or in a generally horizontal orientation depending on the overall orientation of the rear wheel suspension system, or an orientation somewhere in between without departing from the scope of the invention.

The rear wheel suspension system disclosed herein defines a first instant center when the biasing member is at a non-compressed state. The first instant center is located in front of the chainring and generally even with slightly above or slightly below the top point of the circumference of the chainring. The rear wheel suspension system defines a second instant center when the biasing member is at a fully compressed state. The second instant center is at a location behind the first point and approximately even with or slightly above the top point on the circumference of the chainring. A line defined by the migration of the instant center across the compression of the biasing member (i.e., between the first instant center and the second instant center) defines a line above the chain torque line. This line represents the range of suspension compression in the lower gear combinations and above the chain torque line in the higher gear combinations.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

BRIEF DESCRIPTION OF THE DRAWINGS

FIG. 9 is a graph of the Chainline-IC offset of the embodiment of FIG. 1 in a 32/50 gearing.

FIG. 10 is a graph of an anti-squat curve of the embodiment of FIG. 2 in a 44/42 gearing.

FIG. 11 is a graph of an anti-squat curve of the embodiment of FIG. 2 in a 44/10 gearing.

FIG. 12 is a graph of the Chainline-IC offset of the embodiment of FIG. 2 in a 44/42 gearing.

FIG. 13 is a graph of the Chainline-IC offset of the embodiment of FIG. 2 in a 44/10 gearing.

FIG. 14 is a graph of an anti-squat curve of the embodiment of FIG. 3 in a 32/50 gearing.

DETAILED DESCRIPTION OF THE EXEMPLARY EMBODIMENTS

Figure 1:
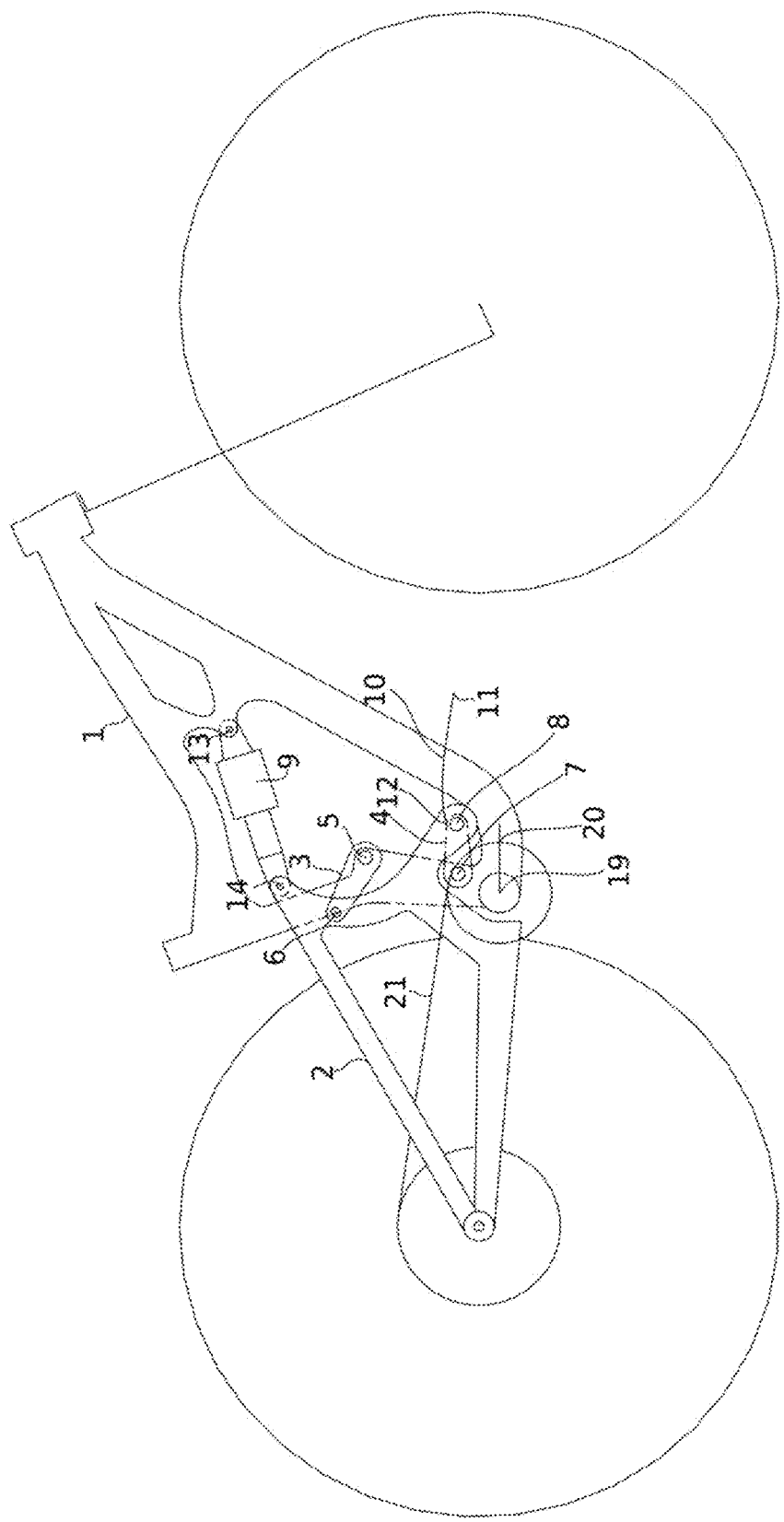
FIG. 1 is an illustration of an embodiment of the invention.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

FIG. 1 is an illustration of an embodiment of the invention. The two wheeled vehicle, in this instance a bicycle, has a front triangle 1 with a bottom bracket 19 and a rear triangle 2. The rear triangle 2 is connected to the front triangle 1 by the upper link 3, the lower link 4, and the rear biasing member 9. The term "triangle" is used herein to designate front or rear parts of a vehicle that have a generally triangular shaped appearance, such as those shown in the figures. The terms "upper" and "lower", for example used in conjunction with "upper linkage" or "lower linkage" are used to designate relative locations when a two wheeled vehicle is in an upright position. The upright position is one considered for riding of the vehicle. The front pivot point 5 of upper link 3 connects the upper link to front triangle 1 and the rear pivot point 6 and upper link 3 connect the rear triangle 2 to the upper link. The rear pivot point 7 of lower link 4 connects the lower link to the front triangle 1 and the front pivot point 8 of lower link 4 connects the lower link to the rear triangle 2. Front pivot point 8 is in front of the front chainring 20. The rear biasing member 9 is connected to the front triangle 1 at connection point 13 and is directly connected to the rear triangle 2 at connection point 14. FIG. 1 illustrates the rear biasing member in a generally horizontal orientation on a bicycle in an upright position.

When an imaginary line is drawn through rear pivot point 6 of upper link 3 and front pivot point 5 of upper link and an imaginary line is drawn through rear pivot point 7 of lower link 4 and front pivot point 8 of lower link an intersecting point of these two imaginary lines is formed and denotes the IC of FIG. 1 when the shock is in an non-compressed state. This intersecting point is called the instant center, IC for short. As the suspension system compresses the front pivot point 8 of the lower link 4 moves upward and the rear pivot point 6 of the upper link mores forward. If imaginary lines are drawn through the pivot points 6 and 5 of the upper link 3 and pivot points 7 and 8 of lower link 4 throughout the range of movement as the suspension compresses the IC can be plotted forming and IC path 10 with an IC start point 11 and an IC end point 12.

The IC path begins in front of the front chainring 20 slightly below being even with the top of the circumference of the chainring 20 and moves (or migrates) rearward and slightly upward as the suspension compresses. This IC path movement maintains the IC above the chain torque line 21 throughout the range of suspension compression in the lower gear combinations and for the most part keeps the IC above the chain torque line 21 in the higher gear combinations. This produces an anti-squat curve that increases in value as the suspension compresses thus aiding and producing pedal efficiency while the connection between rear triangle 2 and the lower link at pivot point 8 being in front of the front chainring 20 produces sensitivity and responsiveness to rough terrain.

Figures 6, 7, 8:
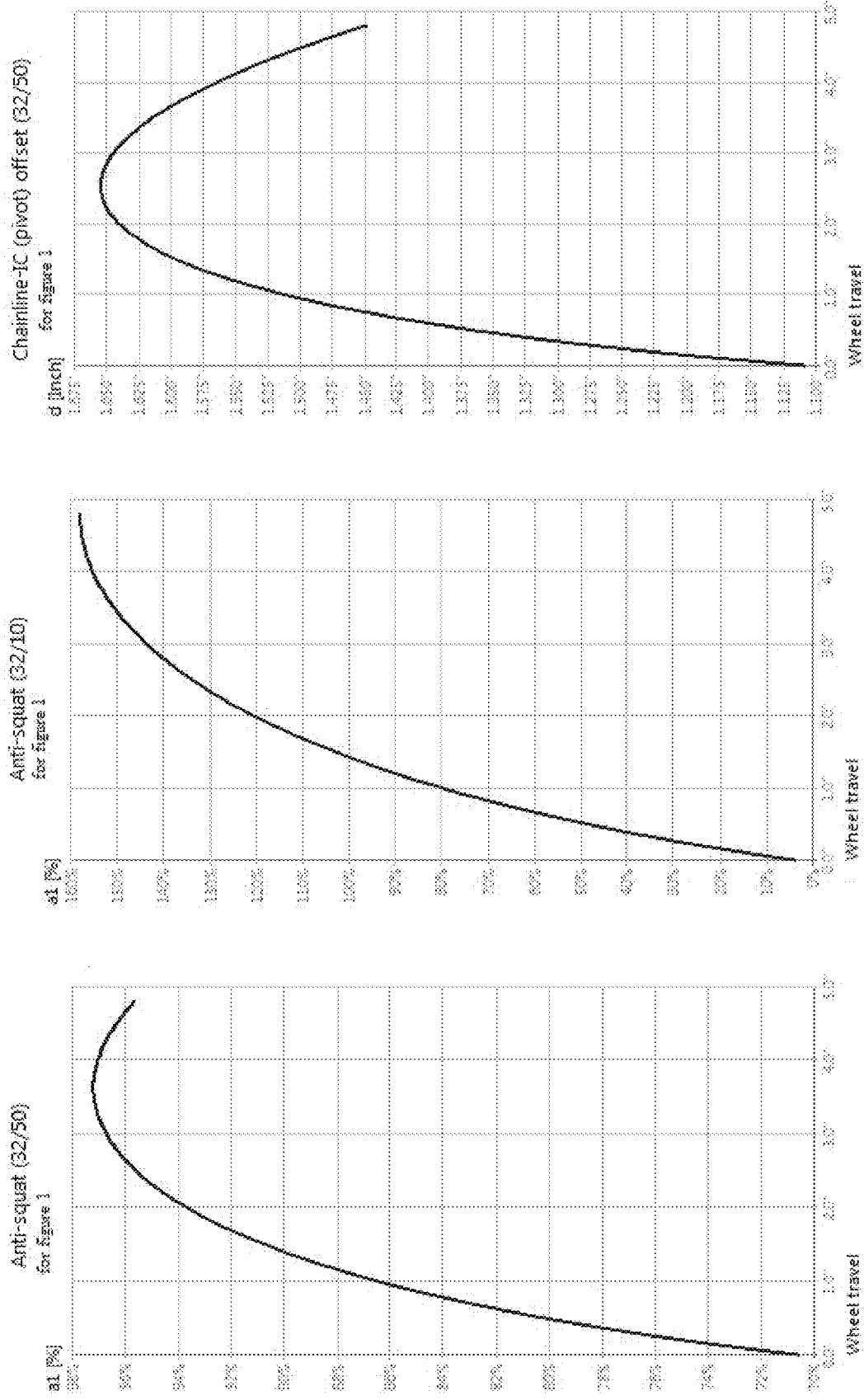
FIG. 6 is a graph of an anti-squat curve of the embodiment of FIG. 1 in a 32/50 gearing.
FIG. 7 is a graph of an anti-squat curve of the embodiment of FIG. 1 in a 32/10 gearing.
FIG. 8 is a graph of the Chainline-IC offset of the embodiment of FIG. 1 in a 32/50 gearing.

FIG. 6 and FIG. 7 illustrate the antisquat curve of the embodiment of FIG. 1 as a percentage as the wheel attached to the rear suspension travels as shown on the Y-axis. FIG. 6 illustrates the antisquat curve for the embodiment of FIG. 1 in a 32/50 gearing. FIG. 7 illustrates the antisquat curve for the embodiment of FIG. 1 in a 32/10 gearing.

FIG. 8 and FIG. 9 illustrate the distance of the IC above an imaginary line throughout the travel range for the depicted gear for the embodiment of a rear suspension shown in FIG. 1. FIG. 8 illustrates the distance of the IC from the chainline through the range of travel in a 32/50 gearing. The distance on the y-axis illustrates the distance above the upper chainline as the embodiment of the rear suspension travels through its range of travel as depicted on the x-axis of FIG. 8. FIG. 9 illustrates the same concept as FIG. 8 but for showing the migration of the IC through the range of travel of the rear suspension shown in a 32/10 gearing.

Figure 2:
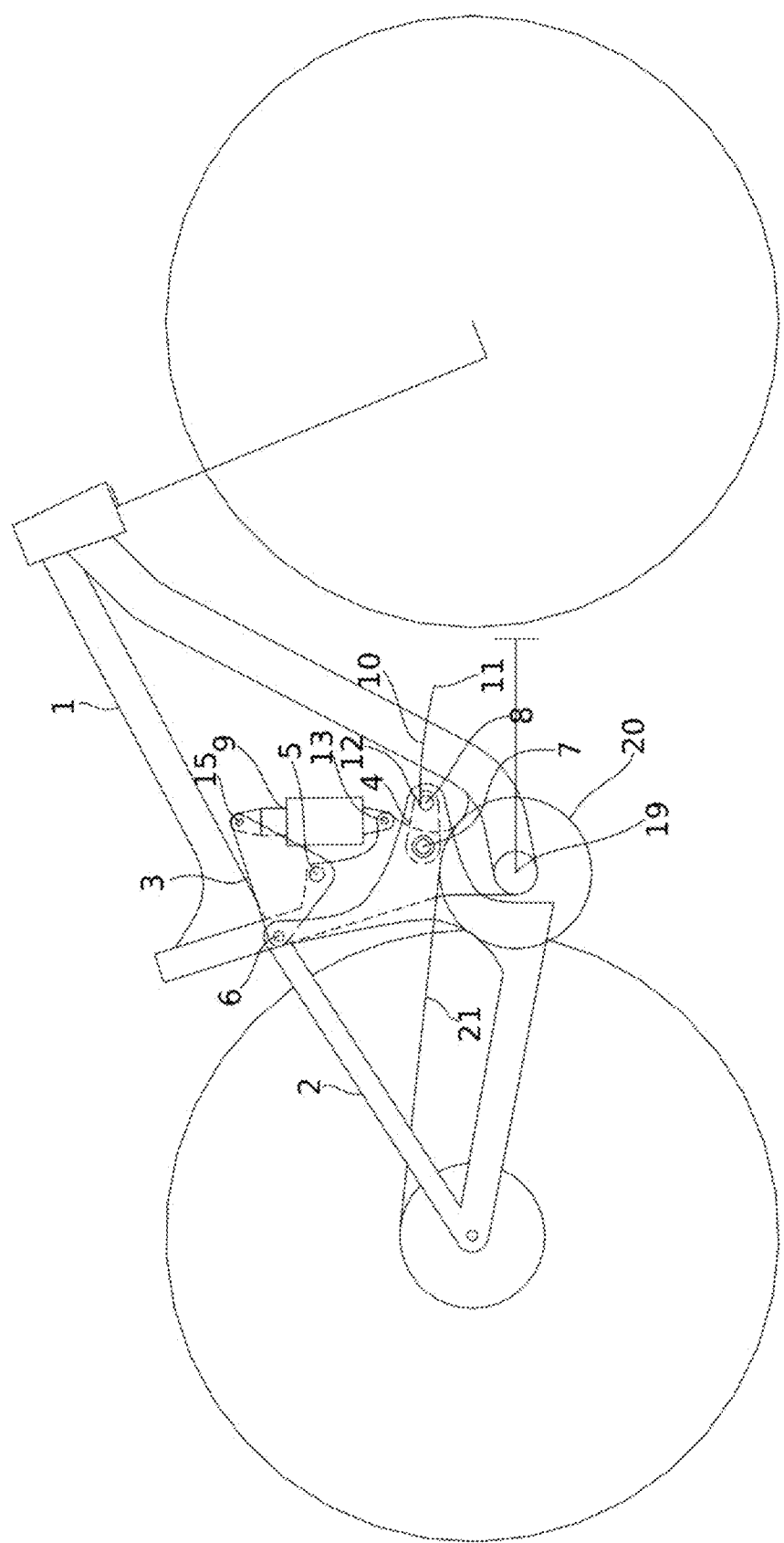
FIG. 2 is an illustration of an embodiment of the invention.

FIG. 2 is an illustration of a further embodiment of the invention. The embodiment of FIG. 2 has a front triangle 1 with a bottom bracket 19 and a rear triangle 2. The rear triangle 2 is connected to the front triangle 1 by the upper link 3 the lower link 4 and the rear biasing member 9. The rear biasing member 9 is functionally connected to said rear triangle via the upper link 3. The front pivot point 5 of upper link 3 connects the upper link to front triangle 1 and the rear pivot point 6 of upper link 3 connect the rear triangle 2 to the upper link. The rear pivot point 7 of lower link 4 connects the lower link to the front triangle 1 and the front pivot point 8 of lower link 4 connects the lower link to the rear triangle 2. Front pivot point 8 is in front of the front chainring 20. The rear biasing member 9 is connected to the front triangle 1 at connection point 13 and is connected to the upper link 3 at connection point 15. FIG. 2 illustrates the biasing member in a generally vertical orientation with the bicycle in an upright position When an imaginary line is drawn through rear pivot point 6 of upper link 3 and front pivot point 5 of upper link and an imaginary line is drawn through rear pivot point 7 of lower link 4 and front pivot point 8 of lower link an intersecting point of these two imaginary lines is formed and denotes the IC of FIG. 2 when the shock is in an non-compressed state. As the suspension system compresses the front pivot point 8 of the lower link 4 moves upward and the rear pivot point 6 of the upper link mores forward. If imaginary lines for drawn through the pivot points 6 and 5 of the upper link 3 and pivot points 7 and 8 of lower link 4 throughout the range of movement as the suspension compresses the IC can be plotted forming and IC path 10 with an IC start point 11 and an IC end point 12. The IC path starts in front of the front chainring 20 slightly above being even with the chainring 20 circumference and moves rearward and upward as the suspension compresses. This IC path movement keeps the IC above the chain torque line 21 throughout the range of suspension compression in the lower gear combinations and keeps the IC above the chain torque line 21 in the higher gear combinations. This produces an anti-squat curve that increases in value as the suspension compresses thus aiding and producing pedal efficiency while the connection between rear triangle 2 and the lower link at pivot point 8 being in front of the front chainring 20 produces sensitivity and responsiveness to rough terrain.

FIG. 10 and FIG. 11 illustrate the antisquat curve of the embodiment of FIG. 2 as a percentage as the wheel attached to the rear suspension travels as shown on the Y-axis. FIG. 10 illustrates the antisquat curve for the embodiment of FIG. 2 in a 44/42 gearing. FIG. 11 illustrates the antisquat curve for the embodiment of FIG. 2 in a 44/10 gearing.

FIG. 12 and FIG. 13 illustrate the distance of the IC above an imaginary line throughout the travel range for the depicted gear for the embodiment of a rear suspension shown in FIG. 2. FIG. 12 illustrates the distance of the IC from the chainline through the range of travel in a 44/42 gearing. The distance on the y-axis illustrates the distance above the upper chainline as the embodiment of the rear suspension travels through its range of travel as depicted on the x-axis of FIG. 12. FIG. 13 illustrates the same concept as FIG. 12 but for showing the migration of the IC through the range of travel of the rear suspension shown in a 44/10 gearing.

Figure 3:
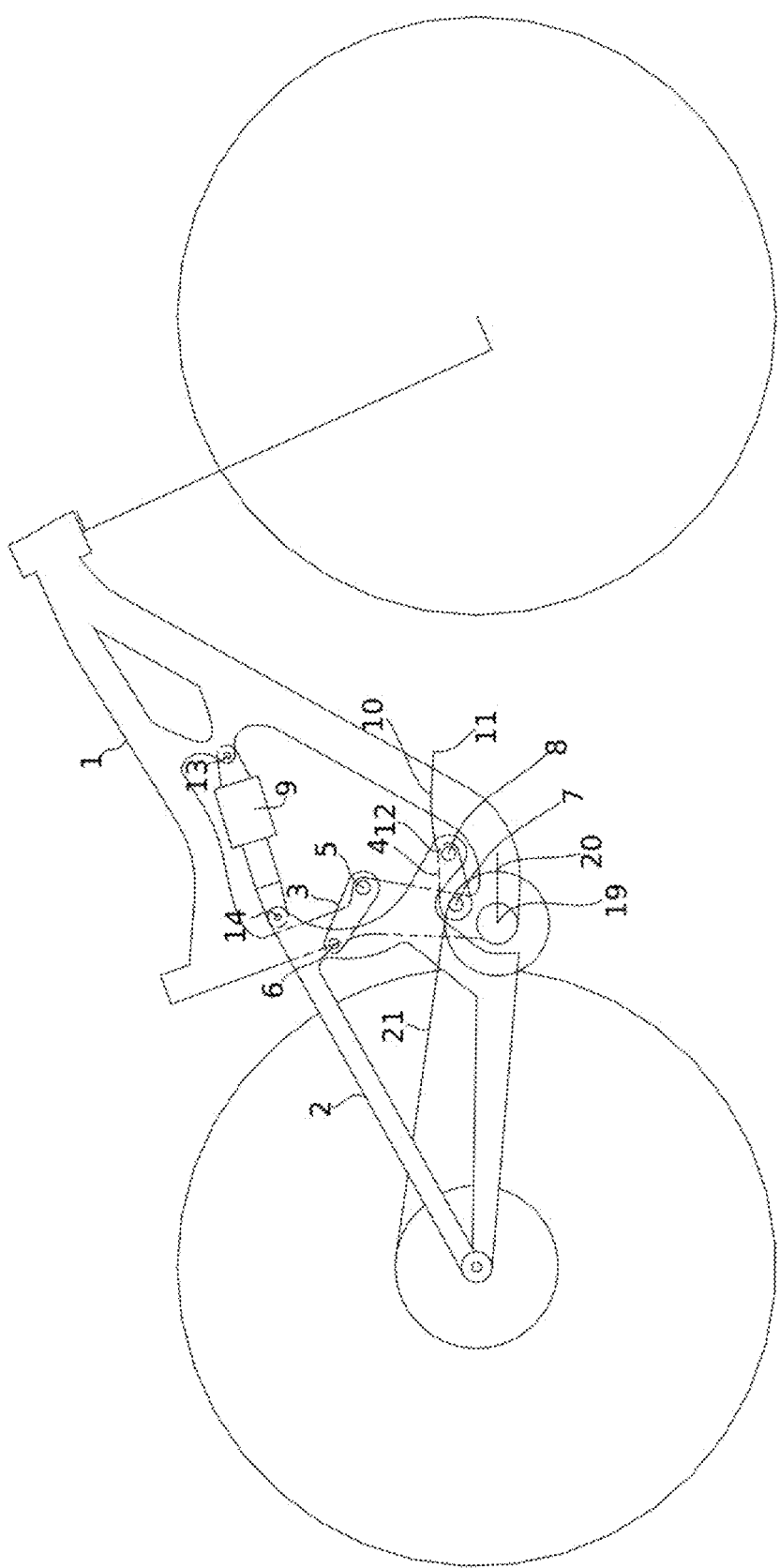
FIG. 3 is an illustration of an embodiment of the invention.

FIG. 3 is an illustration of a further embodiment of the invention. The embodiment of FIG. 3 has a front triangle 1 with a bottom bracket 19 and a rear triangle 2. The rear triangle 2 is connected to the front triangle 1 by the upper link 3 the lower link 4 and the rear biasing member 9. The front pivot point 5 of upper link 3 connects the upper link to front triangle 1 and the rear pivot point 6 of upper link 3 connect the rear triangle 2 to the upper link. The rear pivot point 7 of lower link 4 connects the lower link to the front triangle 1 and the front pivot point 8 of lower link 4 connects the lower link to the rear triangle 2. Front pivot point 8 is in front of the front chainring 20. The rear biasing member 9 is connected to the front triangle 1 at connection point 13 and is connected to the rear triangle 2 at connection point 14.

When an imaginary line is drawn through rear pivot point 6 of upper link 3 and front pivot point 5 of upper link and an imaginary line is drawn through rear pivot point 7 of lower link 4 and front pivot point 8 of lower link an intersecting point of these two imaginary lines is formed and denotes the IC of FIG. 3 when the shock is in an non-compressed state. As the suspension system compresses the front pivot point 8 of the lower link 4 moves upward and the rear pivot point 6 of the upper link mores forward. If imaginary lines for drawn through the pivot points 6 and 5 of the upper link 3 and pivot points 7 and 8 of lower link 4 throughout the range of movement as the suspension compresses the IC can be plotted forming and IC path 10 with an IC start point 11 and an IC end point 12. The IC path starts in front of the front chainring 20 slightly above being even with the top of the chainring 20 circumference and moves rearward and upward as the suspension compresses. This IC path movement keeps the IC above the chain torque line 21 throughout the range of suspension compression in the lower gear combinations and keeps the IC above the chain torque line 21 in the higher gear combinations. This produces an anti-squat curve that increases in value as the suspension compresses thus aiding and producing pedal efficiency while the connection between rear triangle 2 and the lower link at pivot point 8 being in front of the front chainring 20 produces sensitivity and responsiveness to rough terrain.

Figures 15, 16, 17:
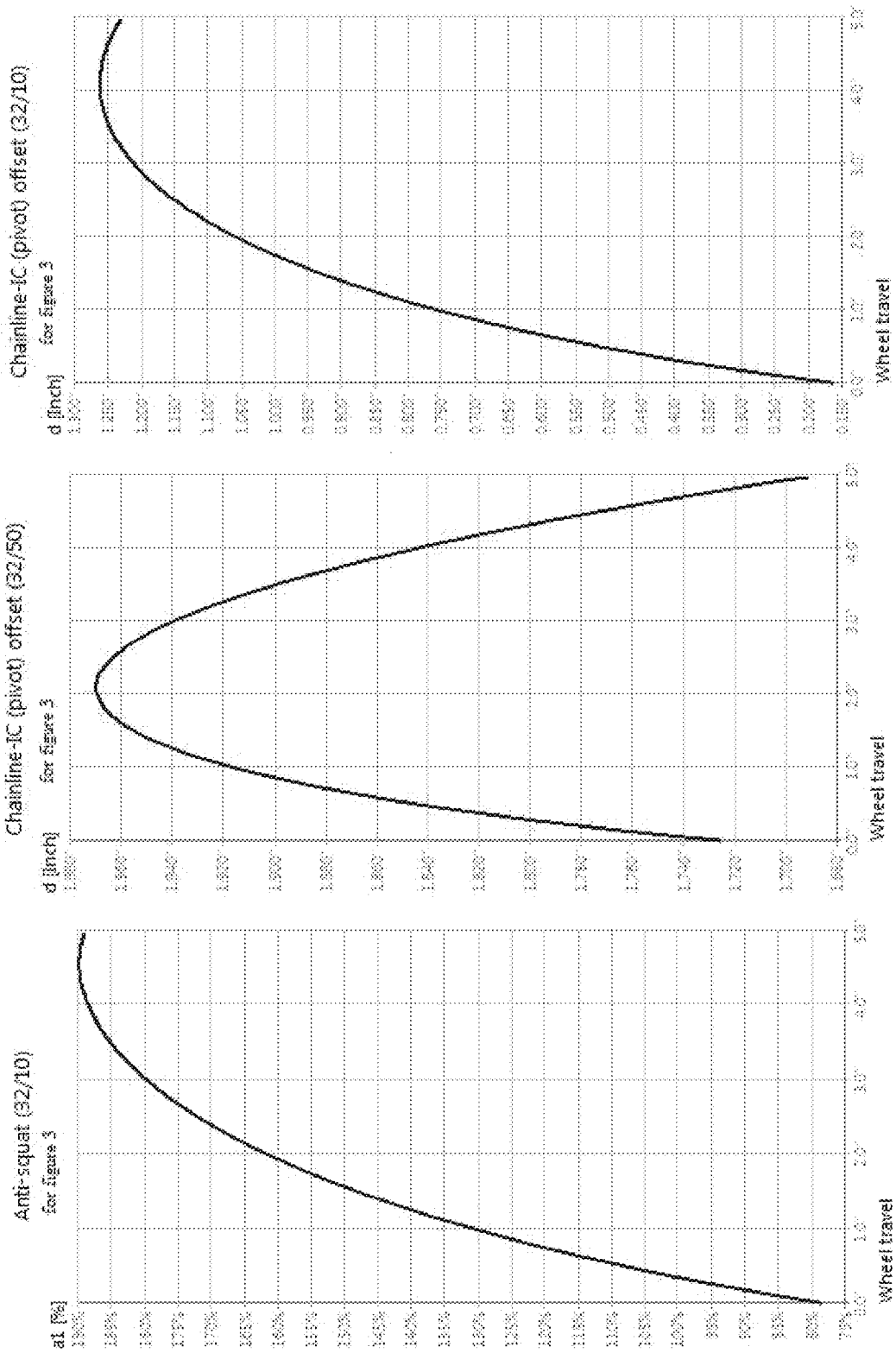
FIG. 15 is a graph of an anti-squat curve of the embodiment of FIG. 3 in a 32/10 gearing.
FIG. 16 is a graph of the Chainline-IC offset of the embodiment of FIG. 3 in a 32/50 gearing.
FIG. 17 is a graph of the Chainline-IC offset of the embodiment of FIG. 3 in a 32/10 gearing.

FIG. 14 and FIG. 15 illustrate the antisquat curve of the embodiment of FIG. 3 as a percentage as the wheel attached to the rear suspension travels as shown on the Y-axis. FIG. 14 illustrates the antisquat curve for the embodiment of FIG. 3 in a 32/50 gearing. FIG. 15 illustrates the antisquat curve for the embodiment of FIG. 3 in a 32/10 gearing.

FIG. 16 and FIG. 17 illustrate the distance of the IC above an imaginary line throughout the travel range for the depicted gear for the embodiment of a rear suspension shown in FIG. 3. FIG. 16 illustrates the distance of the IC from the chainline through the range of travel in a 32/50 gearing. The distance on the y-axis illustrates the distance above the upper chainline as the embodiment of the rear suspension travels through its range of travel as depicted on the x-axis of FIG. 16. FIG. 17 illustrates the same concept as FIG. 16 but for showing the migration of the IC through the range of travel of the rear suspension shown in a 32/10 gearing.

Figure 4:
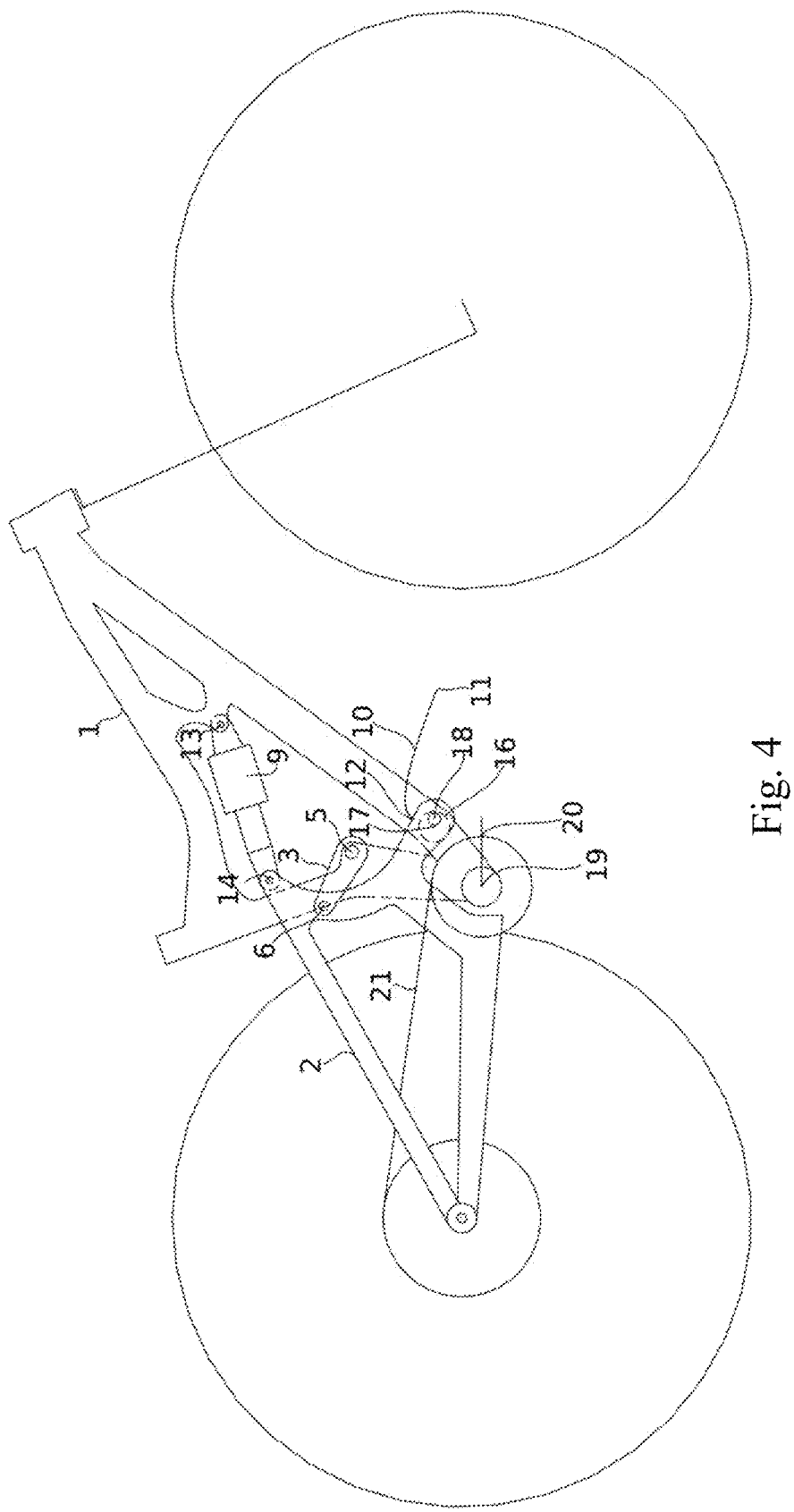
FIG. 4 is an illustration of an embodiment of the invention.

FIG. 4 is an illustration of a further embodiment of the invention. The embodiment of FIG. 4 has a front triangle 1 with a bottom bracket 19 and a rear triangle 2. The rear triangle 2 is connected to the front triangle 1 by the upper link 3 and eccentric pivot 16 and the rear biasing member 9. The front pivot point 5 of upper link 3 connects the upper link to front triangle 1 and the rear pivot point 6 of upper link 3 connect the rear triangle 2 to the upper link. The rear of eccentric pivot point 17 of eccentric pivot 16 connects the eccentric pivot to the front triangle 1 and the front of eccentric pivot point 18 of eccentric pivot 16 connects the eccentric pivot to the rear triangle 2. Front eccentric pivot point 18 is in front of the front chainring 20. The rear biasing member 9 is connected to the front triangle 1 at connection point 13 and is connected to the rear triangle 2 at connection point 14. When an imaginary line is drawn through rear pivot point 6 of upper link 3 and front pivot point 5 of upper link and an imaginary line is drawn through rear eccentric pivot point 17 of eccentric pivot 16 and front eccentric pivot point 18 of eccentric pivot an intersecting point of these two imaginary lines is formed and denotes the IC of FIG. 4) when the shock is in an non-compressed state. As the suspension system compresses the front eccentric pivot point 18 of the eccentric pivot 16 moves upward and the rear pivot point 6 of the upper link mores forward.

If imaginary lines for drawn through the pivot points 6 and 5 of the upper link 3 and eccentric pivot points 17 and 18 of eccentric pivot 16 throughout the range of movement as the suspension compresses the IC can be plotted forming and IC path 10 with an IC start point 11 and an IC end point 12. The IC path starts in front of the front chainring 20 slightly below chainring 20 radius and moves rearward and upward as the suspension compresses. This IC path movement keeps the IC above the chain torque line 21 throughout the range of suspension compression in the lower gear combinations and mostly keeps the IC above the chain torque line 21 in the higher gear combinations. This produces an anti-squat curve that increases in value as the suspension compresses thus aiding and producing pedal efficiency while the connection between rear triangle 2 and the eccentric pivot 16 at eccentric pivot point 18 being in front of the front chainring 20 produces sensitivity and responsiveness to rough terrain.

Figures 18, 19, 20:
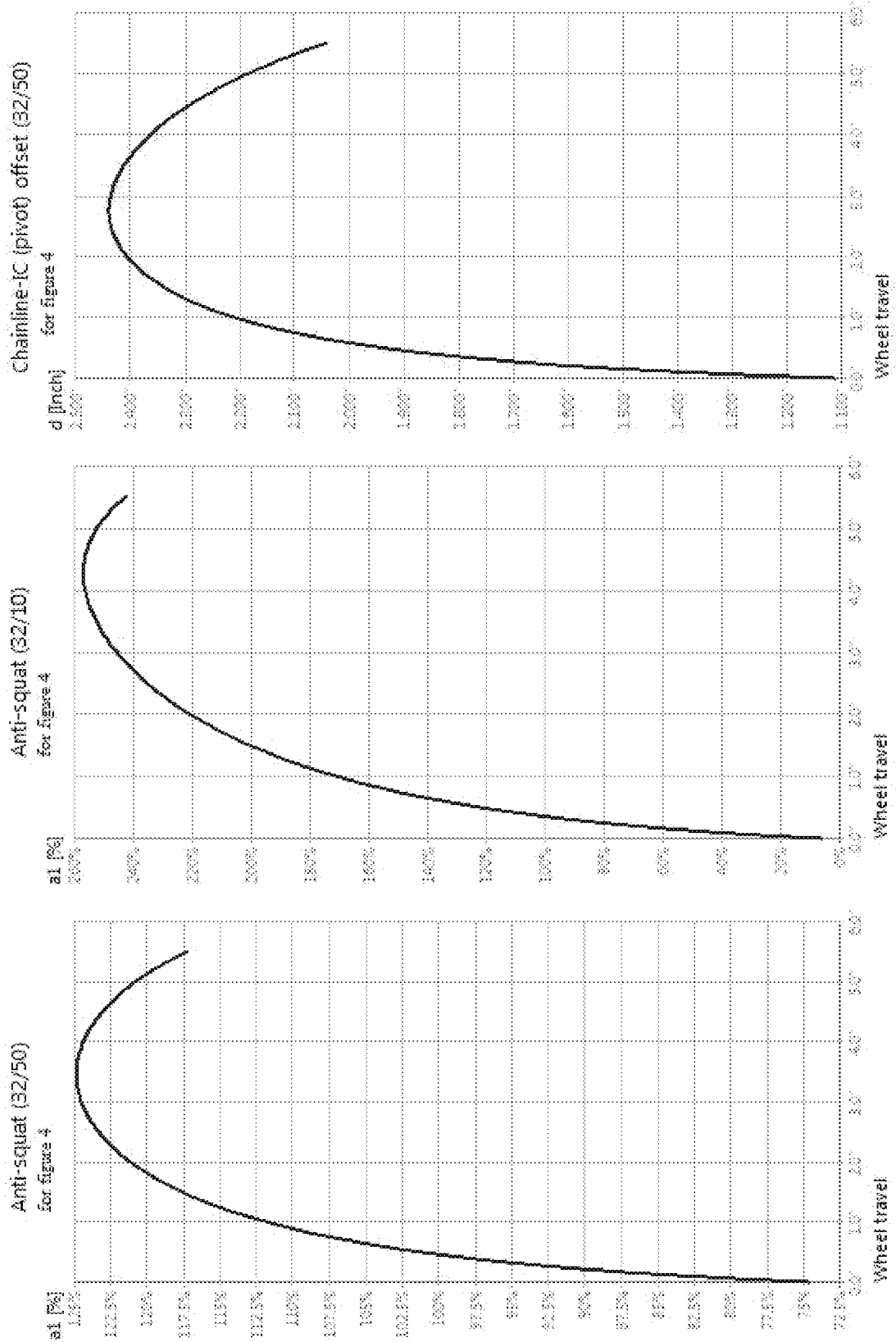
FIG. 18 is a graph of an anti-squat curve of the embodiment of FIG. 4 in a 32/50 gearing.
FIG. 19 is a graph of an anti-squat curve of the embodiment of FIG. 4 in a 32/10 gearing.
FIG. 20 is a graph of the Chainline-IC offset of the embodiment of FIG. 4 in a 32/10 gearing.

FIG. 18 and FIG. 19 illustrate the antisquat curve of the embodiment of FIG. 4 as a percentage as the wheel attached to the rear suspension travels as shown on the Y-axis. FIG. 18 illustrates the antisquat curve for the embodiment of FIG. 4 in a 32/50 gearing. FIG. 19 illustrates the antisquat curve for the embodiment of FIG. 4 in a 32/10 gearing.

Figures 21, 22, 23:
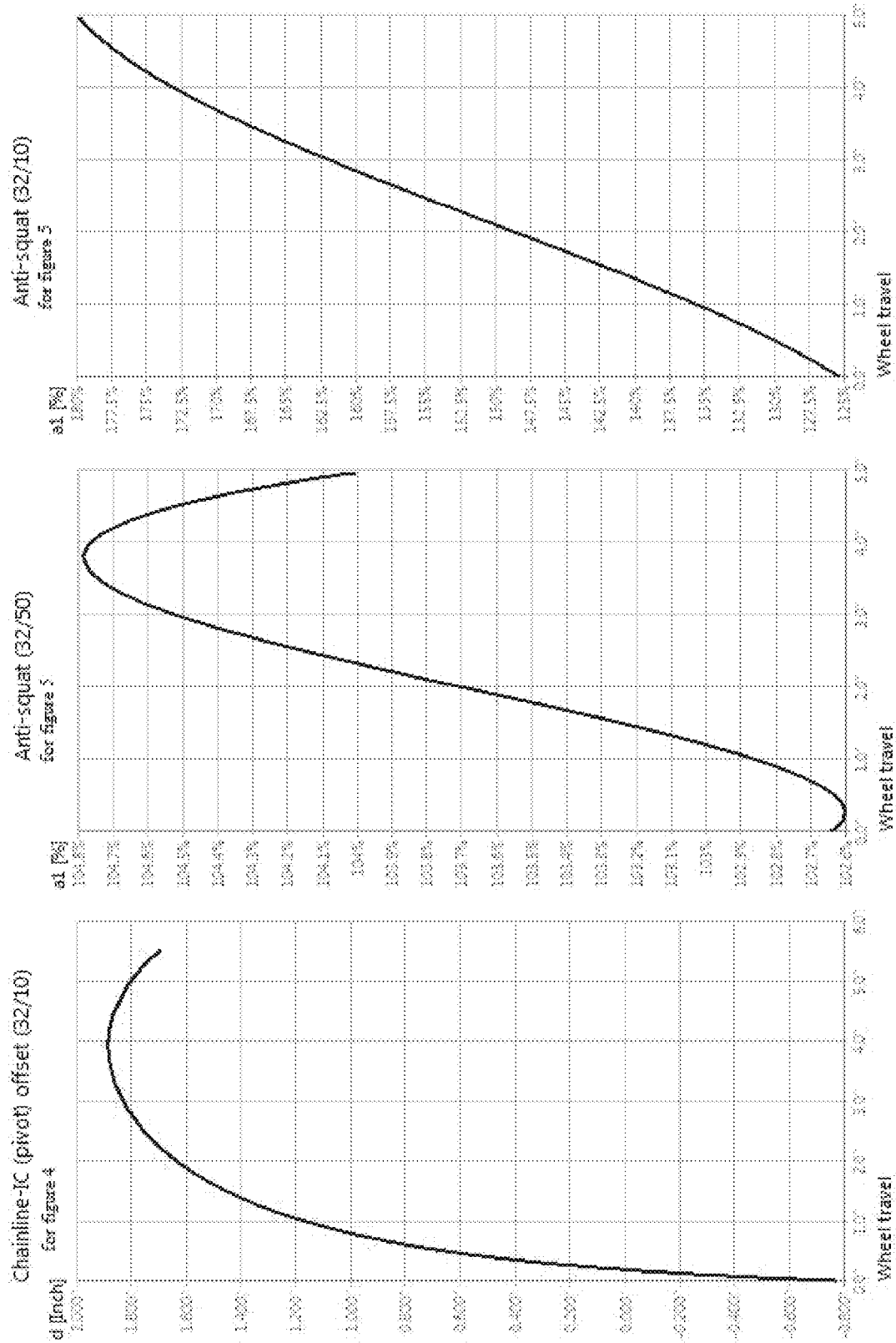
FIG. 21 is a graph of the Chainline-IC offset of the embodiment of FIG. 4 in a 32/50 gearing.
FIG. 22 is a graph of an anti-squat curve of the embodiment of FIG. 5 in a 32/50 gearing.
FIG. 23 is a graph of an anti-squat curve of the embodiment of FIG. 5 in a 32/10 gearing.

FIG. 20 and FIG. 21 illustrate the distance of the IC above an imaginary line throughout the travel range for the depicted gear for the embodiment of a rear suspension shown in FIG. 4. FIG. 20 illustrates the distance of the IC from the chainline through the range of travel in a 32/50 gearing. The distance on the y-axis illustrates the distance above the upper chainline as the embodiment of the rear suspension travels through its range of travel as depicted on the x-axis of FIG. 20. FIG. 21 illustrates the same concept as FIG. 20 but for showing the migration of the IC through the range of travel of the rear suspension shown in a 32/10 gearing.

Figure 5:
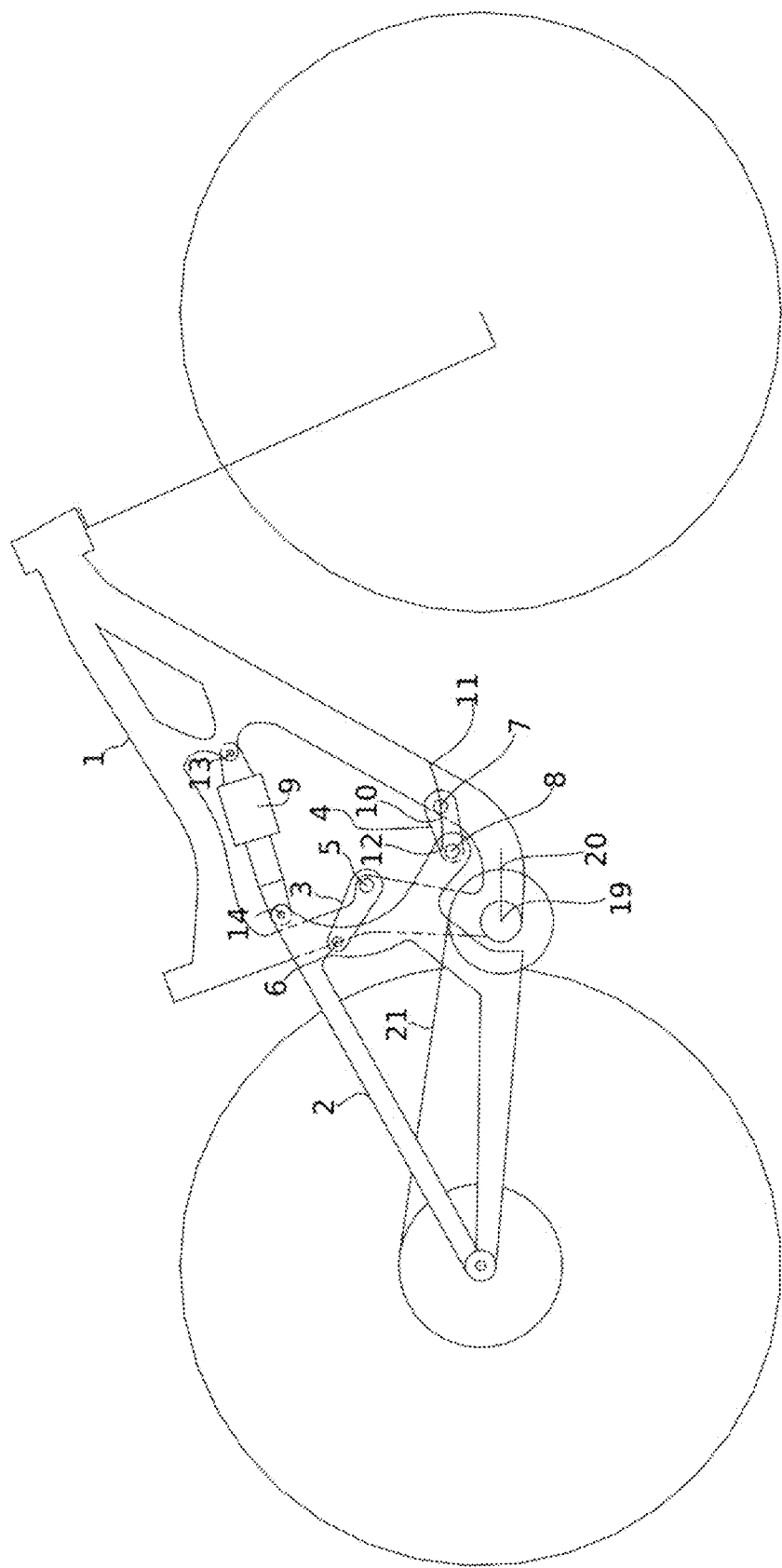
FIG. 5 is an illustration of an embodiment of the invention.

FIG. 5 is an illustration of an embodiment of the invention. The embodiment of FIG. 5 has a front triangle 1 with a bottom bracket 19 and a rear triangle 2. The rear triangle 2 is connected to the front triangle 1 by the upper link 3 the lower link 4 and the rear biasing member 9. The rear pivot point 6 of the upper link 3 connect the rear triangle 2 to the upper link. The front pivot point 7 of the lower link 4 connects the lower link to the front triangle 1. Rear pivot point 8 is in front of the front chainring 20 and connects the lower link to the rear triangle. The rear biasing member 9 is connected to the front triangle 1 at connection point 13 and is connected to the rear triangle 2 at connection point 14. When an imaginary line is drawn through rear pivot point 6 of upper link 3 and front pivot point 5 of upper link and an imaginary line is drawn through rear pivot point 8 of lower link 4 and front pivot point 7 of lower link an intersecting point of these two imaginary lines if formed and denotes the IC of FIG. 5 when the shock is in an non-compressed state. As the suspension system compresses the rear pivot point 8 of the lower link 4 moves upward and the rear pivot point 6 of the upper link moves forward. If imaginary lines are drawn through the pivot points 6 and 5 of the upper link 3 and pivot points 8 (rear pivot point connected to rear triangle) and 7 (forward pivot point connected to the front triangle) of lower link 4 throughout the range of movement as the suspension compresses the IC can be plotted forming and IC path 10 with an IC start point 11 and an IC end point 12. The IC path starts in front of the chainring 20 slightly above being even with the top of the chainring 20 circumference and moves rearward and stays generally level as the suspension compresses. This IC path movement keeps the IC above the chain torque line 21 in the gear combinations illustrated in FIGS. 24-25. This produces an anti-squat curve that increases in value as the suspension compresses thus aiding and producing pedal efficiency while the connection between rear triangle 2 and the lower link at pivot point 8 being in front of the front radius of the front chainring 20 produces sensitivity and responsiveness to rough terrain, as shown in FIGS. 22-23. FIG. 22 and FIG. 23 illustrate the antisquat curve of the embodiment of FIG. 5 as a percentage as the wheel attached to the rear suspension travels as shown on the Y-axis. FIG. 22 illustrates the antisquat curve for the embodiment of FIG. 5 in a 32/50 gearing. FIG. 23 illustrates the antisquat curve for the embodiment of FIG. 5 in a 32/10 gearing.

Figures 24, 25:
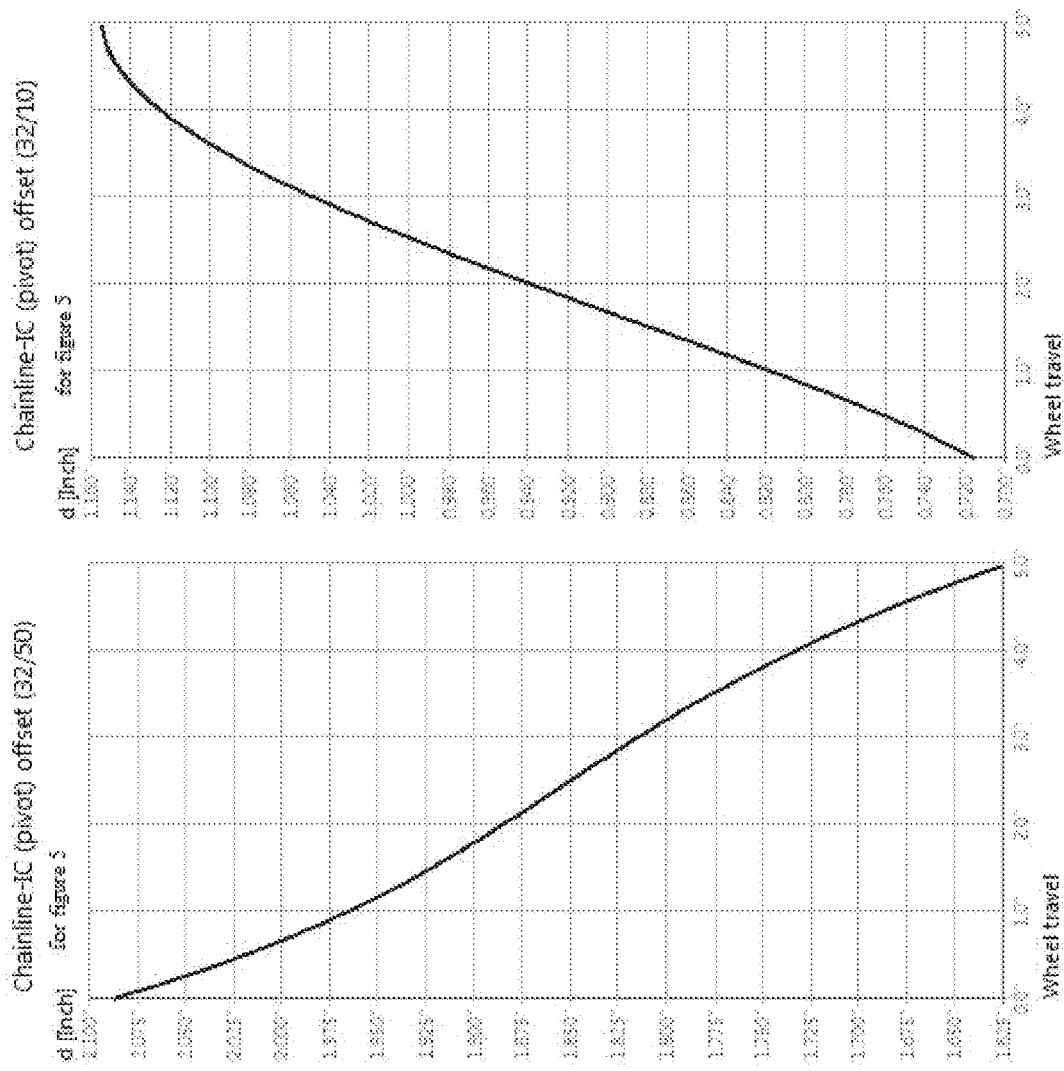
FIG. 24 is a graph of the Chainline-IC offset of the embodiment of FIG. 5 in a 32/50 gearing.
FIG. 25 is a graph of the Chainline-IC offset of the embodiment of FIG. 5 in a 32/10 gearing.

FIG. 24 and FIG. 25 illustrate the distance of the IC above an imaginary line throughout the travel range for the depicted gear for the embodiment of a rear suspension shown in FIG. 5. FIG. 24 illustrates the distance of the IC from the chainline through the range of travel in a 32/50 gearing. The distance on the y-axis illustrates the distance above the upper chainline as the embodiment of the rear suspension travels through its range of travel as depicted on the x-axis of FIG. 24. FIG. 25 illustrates the same concept as FIG. 24 but for showing the migration of the IC through the range of travel of the rear suspension shown in a 32/10 gearing.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

I claim:

1. A rear wheel suspension system for a two-wheeled vehicle, the suspension system comprising:
   a rear triangle,
   a front triangle,
   an upper linkage, wherein said rear triangle being connected to said upper linkage by a first upper pivot member and said front triangle being connected to said upper linkage by a second upper pivot member;
   a rear wheel coupled to said rear triangle;
   a bottom bracket mounted to said front triangle, said bottom bracket being structured to house a pedal assembly, wherein said bottom bracket comprises a chainring mounted on said bottom bracket so as a center of said chainring is at a center of said bottom bracket;
   a biasing member connected to said front triangle and functionally connected to said rear triangle, the biasing member structured to be compressed in response to a force applied to said rear wheel; and
   wherein said front triangle is pivotally connected to said rear triangle at a rear triangle pivot point on said rear triangle generally in front of or even with a forward circumference point on said chainring; and
   wherein said rear wheel suspension system defines a first instant center when said biasing member is at a non-compressed state and located in front of the chainring and generally even with, slightly above, or slightly below a top point on the circumference of said chainring, wherein said rear wheel suspension system defines a second instant center when said biasing member is at a fully compressed state at a location behind said first instant center and approximately even with or slightly above said top point on said chainring, wherein a line defined by the migration of said instant center across the compression of said biasing member defines a line above the chain torque line throughout the range of suspension compression in the lower gear combinations and above the chain torque line in the higher gear combinations.

2. The rear wheel suspension system for a two-wheeled vehicle of claim 1, wherein said pivot point connecting said rear triangle to said front triangle comprises a eccentric pivot.

3. The rear wheel suspension system for a two-wheeled vehicle of claim 1 further comprising a lower linkage, said rear triangle being connected to said lower linkage at said rear triangle pivot point, wherein said lower linkage is connected to said front triangle at a front triangle pivot point.

4. The rear wheel suspension system for a two-wheeled vehicle of claim 1, wherein said biasing member is directly connected to said rear triangle.

5. The rear wheel suspension system for a two-wheeled vehicle of claim 1, wherein said biasing member is functionally connected to said rear triangle via said upper linkage.

6. The rear wheel suspension of claim 1, wherein the vehicle is a bicycle.

7. The rear wheel suspension system for a two wheeled vehicle of claim 1, wherein said biasing member is functionally connected to said rear triangle and connected to said front triangle in a generally vertical orientation when said two wheeled vehicle is oriented in an upright position.

8. The rear wheel suspension system for a two wheeled vehicle of claim 1, wherein said biasing member is functionally connected to said rear triangle and connected to said front triangle in a generally horizontal orientation when said two wheeled vehicle is oriented in an upright position.

9. The rear wheel suspension system for a two wheeled vehicle of claim 5, wherein said upper linkage comprises a generally triangular shape.

* * * * *